(12) United States Patent
Wu et al.

(10) Patent No.: US 8,875,605 B2
(45) Date of Patent: Nov. 4, 2014

(54) SPIRAL CUTTING DEVICE

(75) Inventors: Hsi-Chang Wu, New Taipei (TW); Yung-Chang Tseng, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 61 days.

(21) Appl. No.: 13/592,360

(22) Filed: Aug. 23, 2012

(65) Prior Publication Data
US 2013/0327192 A1  Dec. 12, 2013

(30) Foreign Application Priority Data
Jun. 6, 2012 (TW) .............................. 101120249 A

(51) Int. Cl.
*B23B 29/00* (2006.01)
*B23B 5/48* (2006.01)

(52) U.S. Cl.
USPC .............................................. 82/137; 82/157

(58) Field of Classification Search
CPC .............. B23B 3/18; B23B 5/08; B23B 5/48; B23B 5/46; B23B 5/36; B23B 29/00
USPC ..................... 82/157, 158, 162, 132, 117, 137
See application file for complete search history.

(56) References Cited

U.S. PATENT DOCUMENTS

| | | | | |
|---|---|---|---|---|
| 3,946,774 A * | 3/1976 | McCord, Jr. | ..................... | 142/26 |
| 4,911,044 A * | 3/1990 | Mishiro et al. | .................. | 82/158 |
| 6,040,653 A * | 3/2000 | O'Neill | ......................... | 310/328 |
| 6,952,627 B2 * | 10/2005 | Olczak et al. | ................. | 700/191 |
| 7,441,484 B1 * | 10/2008 | Larsen et al. | ................. | 82/1.11 |
| 7,849,769 B2 * | 12/2010 | Akiyama | ......................... | 82/121 |
| 8,413,557 B2 * | 4/2013 | Akiyama et al. | ................ | 82/118 |

* cited by examiner

*Primary Examiner* — Will Fridie, Jr.
(74) *Attorney, Agent, or Firm* — Novak Druce Connolly Bove + Quigg LLP

(57) ABSTRACT

A spiral cutting device includes a blade, a blade driving shaft, a guiding device, a driving device, and a controller. The blade is for processing a roller. The blade driving shaft drives the blade to move toward the roller. The guiding device moves in a guiding direction perpendicular to a moving direction of the blade. The driving device is movably supported on the guiding device and rotates the roller. The controller controls a feeding amount of the blade, a moving speed of the driving device, and a rotate speed of the roller to spirally cut the roller. When an outer surface of the roller is unfolded to a plane, the blade path of the blade is in sinusoidal shape or in cosinusoidal shape.

4 Claims, 3 Drawing Sheets

SPIRAL CUTTING DEVICE

BACKGROUND

1. Technical Field

The present disclosure relates to cutting devices, and particularly to a spiral cutting device.

2. Description of Related Art

Rollers with micro-sized structures are generally used to print a pattern on a substrate to form a functional sheet, such as light enhance film. The micro-sized structures are formed on the roller by a plunge cutting device. However, the plunge cutting device needs to reposition the substrate after one micro-sized structure has been formed, which results in a low efficiency and precision.

Therefore, it is desirable to provide a spiral cutting device, which can overcome the limitations described.

DETAILED DESCRIPTION

Embodiments of the disclosure will be described with reference to the drawings.

Figure 1:
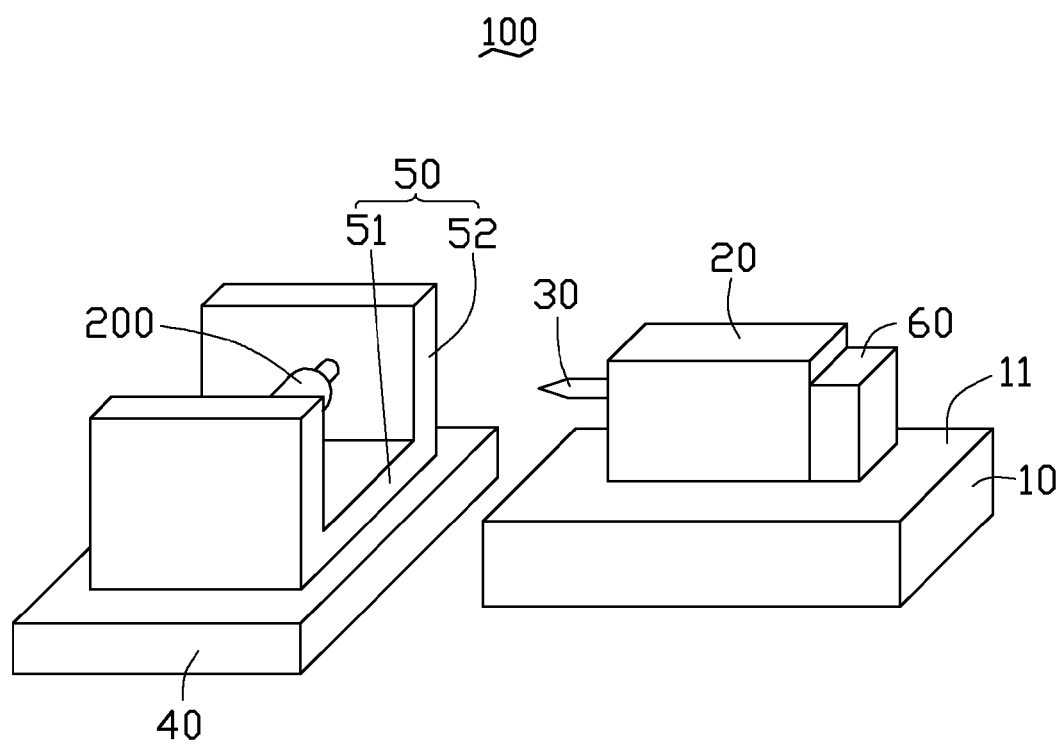
FIG. 1 is an isometric view of a spiral cutting device in accordance with an exemplary embodiment.
Figure 2:
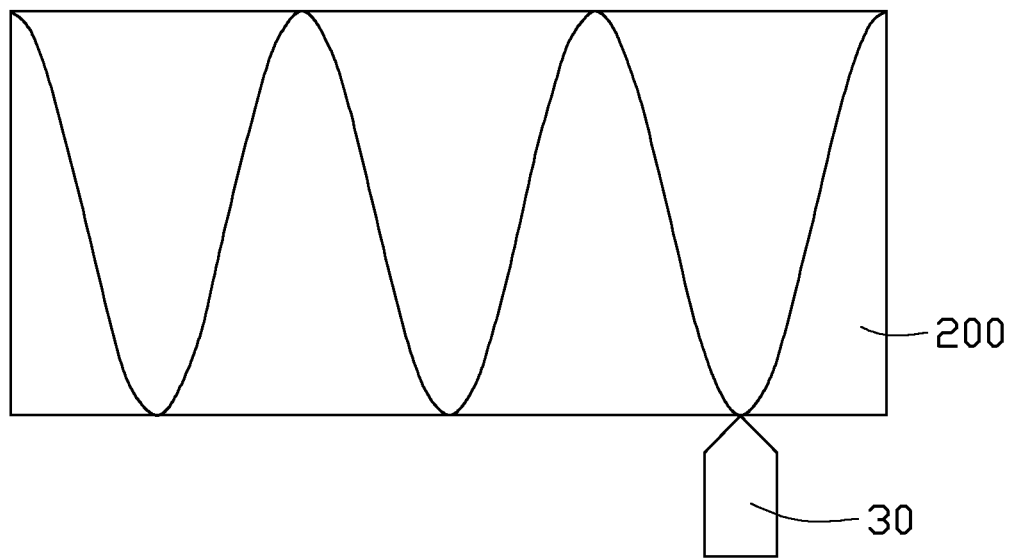
FIG. 2 showing a blade path of a blade of the spiral cutting device of FIG. 1.
Figure 3:
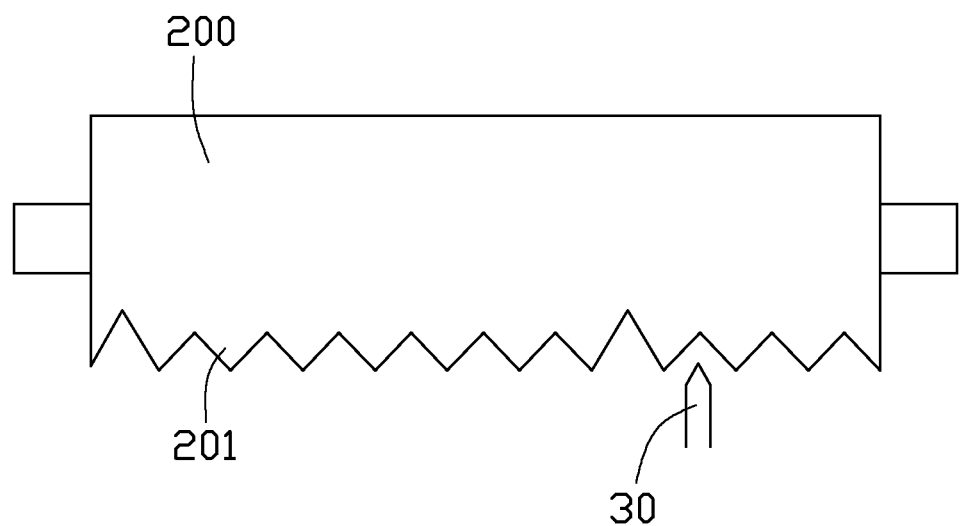
FIG. 3 is a planar view of a roller processed by the spiral cutting device of FIG. 1.

Referring to FIGS. 1-3, a spiral cutting device 100, according to an exemplary embodiment, is configured for forming micro-sized structures on a roller 200. The spiral cutting device 100 includes a base 10, a blade driving shaft 20, a blade 30, a guiding device 40, a driving device 50, and a controller 60.

The base 10 includes an upper surface 11. A number of auxiliary systems, such as, a power system and a cooling system, are fixed to the base 10.

The blade driving shaft 20 is positioned on the upper surface 11. The blade driving shaft 20 is a piezoelectric driving shaft, and the maximum moving frequency is about 400 HZ and the maximum moving distance is about 70 um. In the embodiment, a driving direction of the blade driving shaft 20 is defined as a Y-axis of a coordinate.

The blade 30 is assembled on one end of the blade driving shaft 20 and points to the driving direction of the blade driving shaft 20. The blade driving shaft 20 is configured for driving the blade 30 to process (i.e., cut) the roller 200. For enhancing a processing precision, a diameter of a processing end of the blade 30 is less than 0.01 um and the blade 30 is made of high hardness and wear resistant material.

The guiding device 40 is positioned adjacent to the base 10. A guiding direction of the guiding device 40 is substantially perpendicular to the driving direction of the blade driving shaft 20 and a moving direction of the blade 30. In the embodiment, the guiding direction of the guiding device 40 is defined as a Z-axis of a coordinate.

The driving device 50 is movably positioned on the guiding device 40. The driving device 50 is driven to move along the guiding direction by the guiding device 40. The driving device 50 includes a lower plate 51 and two supporting arms 52 extended upward from two opposite edges of the lower plate 51. The lower plate 51 is supported on the guiding device 40. A coupling structure coupled with the guiding device 40 is defined on a bottom surface of the lower plate 51. The roller 200 to be processed is rotatably held between the two supporting arms 52. The roller 200 is driven to rotate around the Z-axis by the driving device 50.

The controller 60 is positioned on the base 10, and is electrically connected to the blade driving shaft 20, the guiding device 40, and the driving device 50. The controller 60 controls a feeding amount of the blade 30 by controlling the blade driving shaft 20, controls a moving speed of the driving device 50 by controlling the guiding device 40, and controls a rotation speed of the roller 200 by controlling the driving device 50. The controller 60 controls the feeding amount of the blade 30, the moving speed of the driving device 50, and the rotation speed of the roller 200 to spirally cut the roller 200.

After an outer surface of the roller 200 is processed by the spiral cutting device 100, a number of cones 201 are arrayed in the outer surface. Assuming that an outer surface of the roller 200 is unfolded to a plane, the blade path of the blade 30 is in sinusoidal shape or in cosinusoidal shape. In the embodiment, the micro-sized structure processed by the spiral cutting device 100 includes one high cone 201 and seven adjacent low cones 201 alternately arrayed.

In use, an operator stores a digital control program compiled according to the blade path of the spiral cutting in the controller 60. The roller 200 to be processed is held on the spiral cutting device 100. At last, the spiral cutting device 100 starts to spirally cut the roller 200 as the arrayed cones 201 are formed on the outer surface of the roller 200. Since the spiral cutting is continuously performed and the blade 30 does not need to reposition during the process, the processing speed and precision are increased.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A spiral cutting device configured for processing a roller, comprising:
    a blade for processing the roller;
    a blade driving shaft holding the blade and configured for driving the blade to move in a moving direction;
    a guiding device capable of moving in a guiding direction perpendicular to the moving direction of the blade;
    a driving device movably supported on the guiding device and configured for rotating the roller, the driving device comprises a lower plate and two supporting arms extending upward from two opposite edges of the lower plate, the lower plate is supported on the guiding device, and the two supporting arms are configured for rotatably holding the roller; and
    a controller in communication with the blade driving shaft, the guiding device, and the driving device and configured for controlling a feeding amount of the blade, a moving speed of the driving device, and a rotate speed of the roller to spirally cut the roller; wherein when an outer surface of the roller is unfolded to a plane, a blade path of the blade is in sinusoidal shape or in cosinusoidal shape.

2. The spiral cutting device of claim 1, wherein the blade driving shaft is a piezoelectric driving shaft.

3. The spiral cutting device of claim 2, wherein the maximum moving frequency of the blade driving shaft is about 400 HZ, and the maximum moving distance of the blade driving shaft is about 70 um.

4. The spiral cutting device of claim 1, wherein the controller stores a digital control program compiled according to the blade path of the blade.

* * * * *